United States Patent Office 3,093,567
Patented June 11, 1963

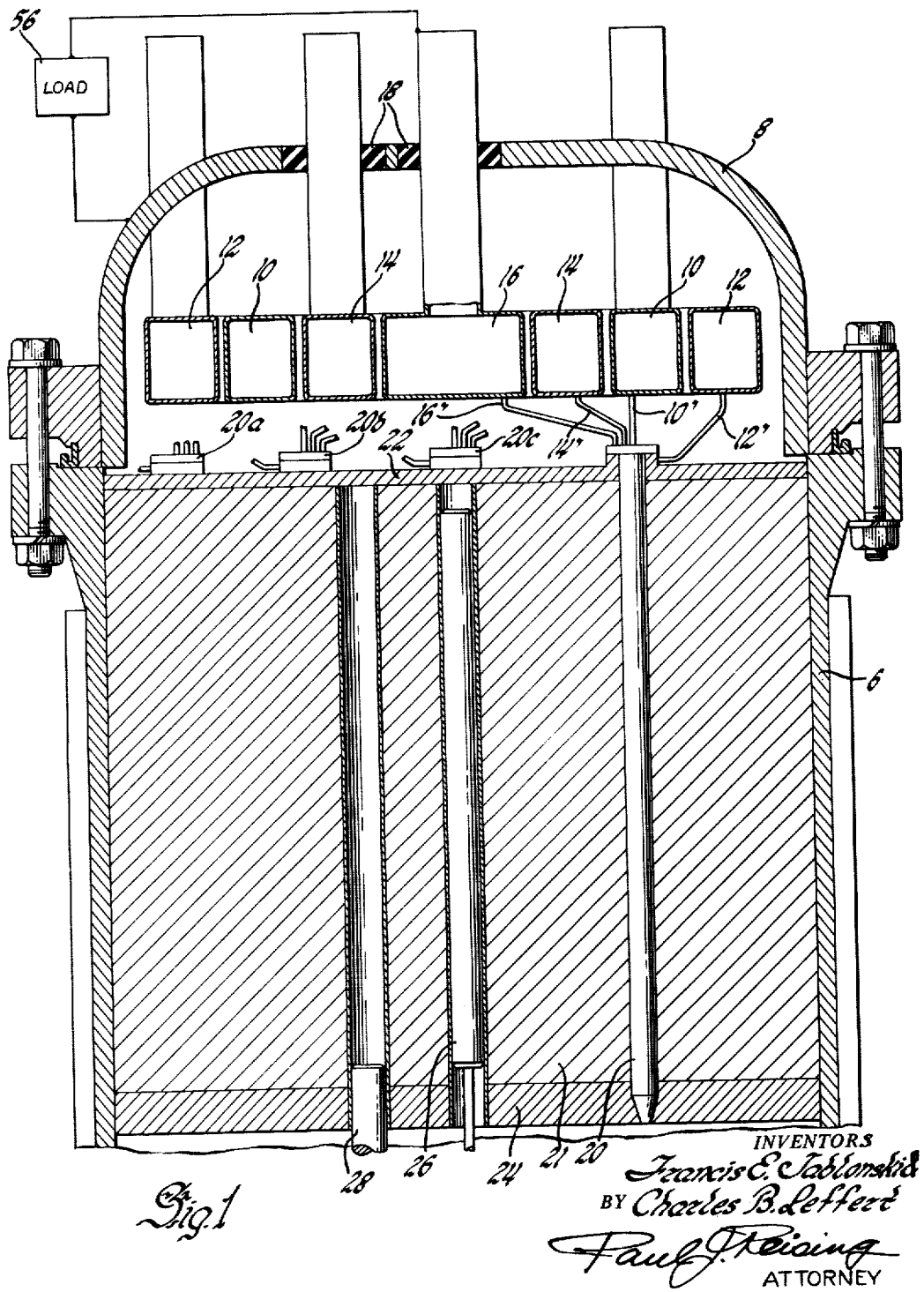

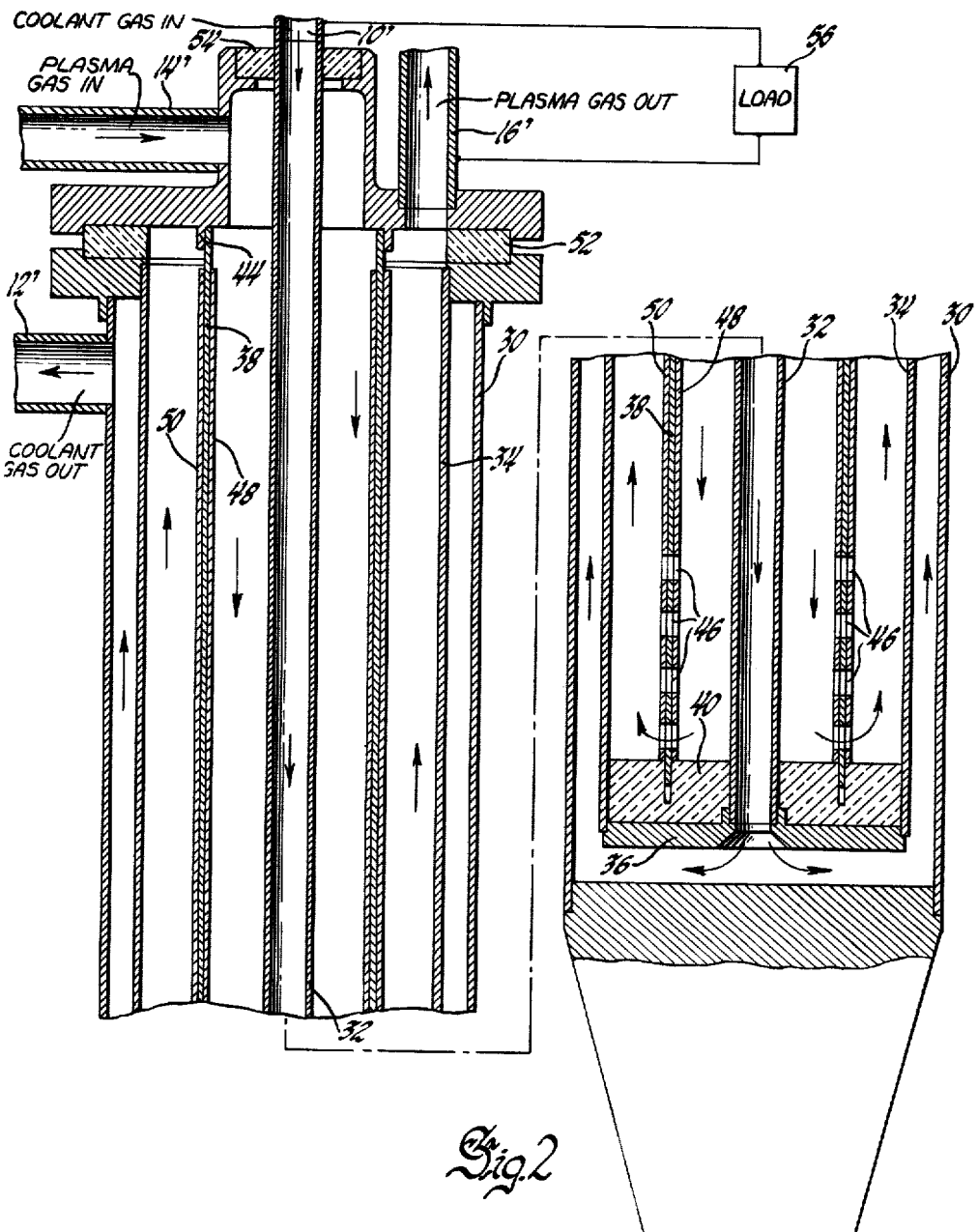

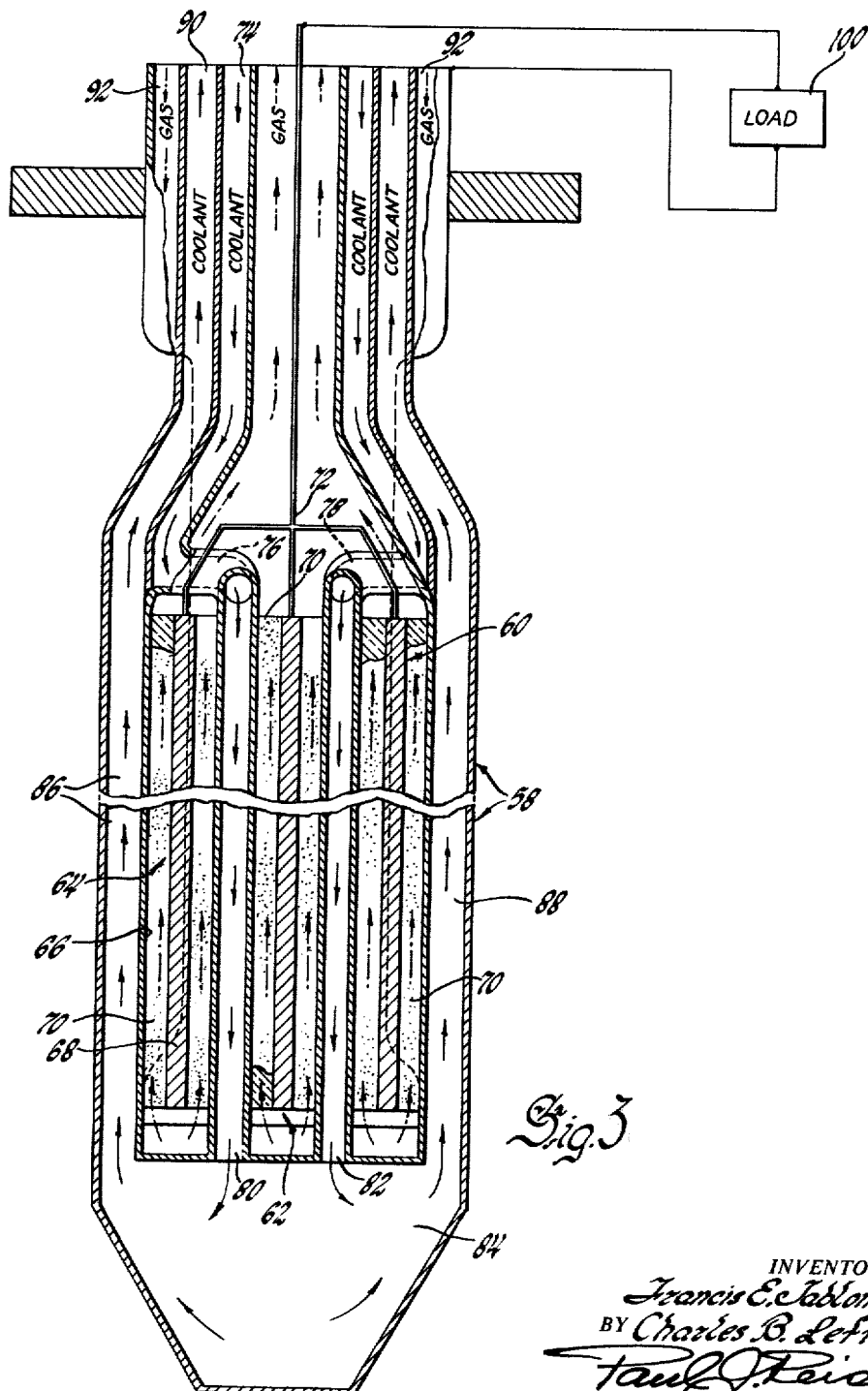

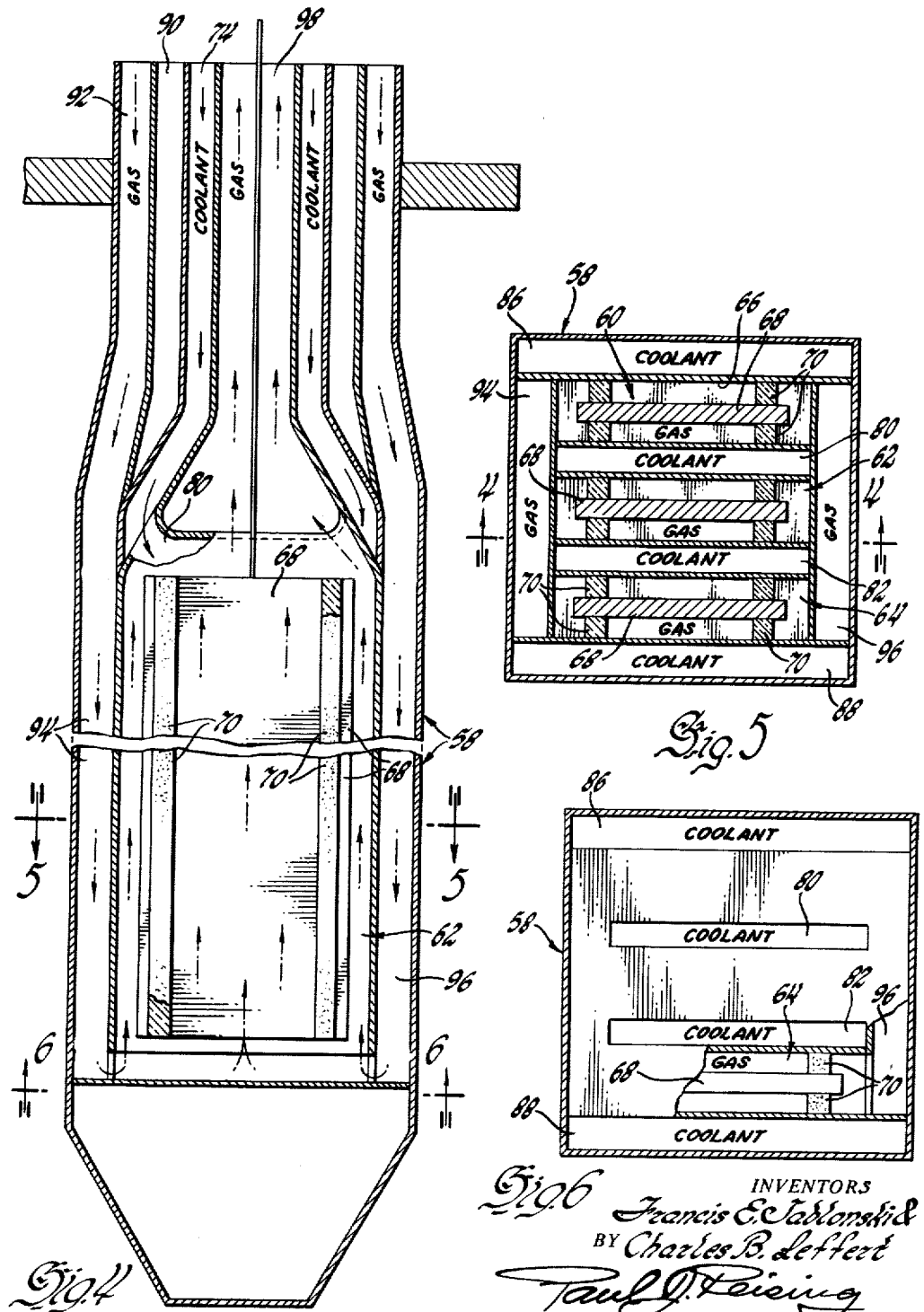

3,093,567
NUCLEAR DEVICE FOR GENERATING
ELECTRIC POWER
Francis E. Jablonski, Birmingham, and Charles B. Leffert, Oak Park, Mich., assignors to General Motors Corporation, Detroit, Mich., a corporation of Delaware
Filed Mar. 30, 1959, Ser. No. 802,958
15 Claims. (Cl. 204—193.2)

This invention relates to an electric power generator and, more particularly, to a device and system for generating electric power directly from nuclear fission heat.

The systems which are presently used to convert nuclear energy from a nuclear reactor to electrical energy consist generally of a fluid coolant circuit to transfer the heat generated by the reactor to water for the generation of steam, and a conventional steam turbine-electrical generator combination to convert the steam power to electricity. Such systems are bulky and complex by way of the large number of separate components required and are inefficient because of the multiplicity of energy transfers and transformation involved. Hence, there exists a need for a lighter less complex and otherwise improved means for converting nuclear energy to electricity, particularly for use in mobile installations.

It is an object of the present invention to provide a highly improved device for converting nuclear fission generated heat to useful electrical power.

Another object of the invention is to provide a nuclear reactor which incorporates means for converting at least a portion of the heat product from the fissile mass within the reactor directly to D.C. electric current.

Another object is the provision of a thermoelectric cell wherein the required heat is supplied by nuclear fission.

Still another object is the provision of a nuclear reactor containing a number of fuel elements which in the aggregate comprise a critical mass of fissile material and each of which individually comprises a thermoelectric cell productive of D.C. current.

Other objects and advantages of the invention will appear more clearly from the following detailed description thereof made principally with reference to the embodiments shown in the accompanying drawings in which:

FIGURE 1 is a side view in section, but with parts removed, of a nuclear reactor embodying the invention;

FIGURE 2 is a side view in section of one embodiment of a fuel element which may be used in the reactor shown in FIGURE 1;

FIGURE 3 is a side view in section, but with parts broken away, of another embodiment of a fuel element which may be used in the FIGURE 1 reactor;

FIGURE 4 is a view taken on the line 4—4 of FIGURE 5;

FIGURE 5 is a view taken on the line 5—5 of FIGURE 4; and

FIGURE 6 is a view, with parts broken away, taken on the line 6—6 of FIGURE 4.

Essentially the electrical power generator of this invention comprises one or a number of elements containing, in the aggregate, sufficient fissile material to sustain a nuclear fission reaction, at least one of the elements constituting a thermoelectric cell wherein the fissile material forms the cathode and a cooled conductive surface, spaced from the fissile material by a fission fragment ionized plasma, forms the anode. Hence the fissile material functions not only to generate the required heat but also to generate the plasma. The cell of this invention can also be viewed as a Seebeck E.M.F. generating thermocouple, the cathode-plasma junction forming the hot junction and the anode-plasma junction forming the cold junction.

Before proceeding to further describe the invention by reference to specific structural embodiments thereof, the following is advanced as an explanation of its operation though it should be understood that the utility of the invention is not predicated upon the accuracy or completeness of the theory set forth.

It is well known that when one electrode of a vacuum diode is heated and the other electrode cooled, an E.M.F. is generated by way of thermionic emission from the hot electrode, the magnitude of the E.M.F. developed being dependent upon the temperature differential and on the work functions of the electrodes. By substituting a highly ionized gas, i.e., a plasma, for the vacuum, space charge limitations can be removed with the result that thermionic emission from the hot electrode (cathode) is enhanced and the current output greatly increased. With space charge limitations removed, the magnitude of electron emission from the cathode follows Richardson's law:

$$J = A T_c^2 e^{-e\phi_c / kT_c}$$

where $J$ is in amp./cm.$^2$; $A$ is the thermionic constant of the cathode, $T_c$ is the temperature of the cathode in ° K., $\phi_c$ is the work function of the cathode, and $k$ and $e$ are constants. Thus, the higher the temperature and the lower the work function of the cathode, the greater will be the current density produced. With a sufficiently high $T_c$ and a low $\phi_c$, the current density can be on the order of 25 amperes/cm.$^2$ or greater.

The cell of this invention comprises a plasma-filled diode, one of the unique features of which is the means used for generating the plasma, to wit, by fission fragment ionization of a suitable gas between the cathode and the anode, the fission fragments being the product of the outer layer of fissile material which forms the cathode. This feature is based on the fact that fragments from fissioning material produce copious ionization when they penetrate a gas. For example, in a one cm. gap of argon at 20 mm. pressure, fission fragments from enriched uranium in a flux of $10^{12}$ neutrons/cm.$^2$ sec. will deposit 6 mev. of energy/fragment resulting in $7.8 \times 10^{15}$ ion pairs/cm.$^3$/sec. Depending upon the particular recombination coefficient of the gas selected, this results in a plasma ion density of $10^{11}$ to $10^{14}$ ions/cm.$^3$. These magnitudes are ample to neutralize the electron space charge.

Viewing the cell of this invention as a diode with space charge build-up eliminated, the total E.M.F. generated, $V_0$, will be determined by the difference between the work function of the hot cathode and that of the cold anode:

$$V_0 = \phi_c - \phi_a$$

That is, electrons in the cathode having an energy greater than $\phi_c$ escape from the cathode and proceed to the anode. An amount of energy $\phi_a$ is given up at the anode as heat and the remainder, $\phi_c - \phi_a$, is available for work on an external load. The efficiency of the cell in converting heat to electricity can be written as:

$$\eta = \frac{\text{Power Out}}{\text{Power In}} = \frac{IV_0}{I\phi_c + P_R + P_C + P_I}$$

where $I = J \times$ area of cathode, $P_R$ is the heat loss by radiation transfer from the cathode, $P_C$ is the heat loss by conduction from the cathode, and $P_I$ is the Joule heat loss in the plasma and metal leads. Efficiency is clearly a function of temperature and work functions. The cell resistance which determines the heat loss in the plasma consists of ion resistance and neutral atom resistance to electron conduction. In accordance with one feature of the invention, the latter resistance is made very small relative to the former by using a noble gas which has a small electron-atom collision cross section.

The cell can also be viewed as an E.M.F. generating thermocouple, the plasma being considered as a nondegenerate electron gas having a thermoelectric power S, the E.M.F. generated by the cell being given by:

$$V_0 = S(T_c - T_a)$$

where $T_c$ is the cathode temperature and $T_a$ the anode temperature in °K. In accordance with this second description, the efficiency can be written:

$$\eta = \frac{P_{out}}{P_R + P_C + P_I + P_P}$$

where the output power into a matched load (load impedance $R_L$ = cell impedance) is given by:

$$P_{out} = \frac{[S(T_c - T_a)]^2}{8R_L}$$

with $P_P$ being the Peltier heat absorbed by the cathode $ST_cI$; the other terms have been previously described.

Following either description, it is found that with a $\Delta T$ in the range of 2000 to 3000° K., an E.M.F. on the order of 2 volts or more and therefore a power output of a magnitude on the order of 50 watts/cm.² can be achieved, with conversion efficiencies of about 30%. The limiting factor in the attainment of higher conversion efficiencies will generally be the evaporation rate of the cathode which becomes greater with higher operating temperatures.

Referring now to FIGURE 1, there is shown a nuclear reactor including a stainless steel or other suitable metal vessel having a lower cylindrical portion 6 which constitutes the reactor core zone and an upper portion 8 which houses cooling fluid inlet and outlet conduits 10 and 12, respectively, and noble gas inlet and outlet conduits 14 and 16, respectively, the conduits 14 and 16 being electrically insulated from the metal vessel by ceramic or other suitable insulating material such as shown at 18. The core zone houses a number of concentric ring arranged fuel elements, one of which is shown at 20 and others of which are indicated at 20a and 20b and 20c. These fuel elements are nested in a suitable moderator 21 such as graphite with the end portions resting in metal locating plates 22 and 24 extending transversely of the reactor vessel. The structure of the fuel elements will hereinafter be described in detail; however, suffice it to say at this time that each of these elements contains sufficient fissile material that in the aggregate the total fissile material in the core zone exceeds criticality and hence can sustain a nuclear chain reaction. Suitable control rods 26 and 28 of high cross section material such as cadmium are insertable into the core zone to control the neutron flux and therefore the rate of nuclear reaction. As shown, control rod 26 is fully inserted into the core zone and control rod 28 is only partially inserted. The sensing instruments for these control rods and the mechanisms for their actuation in accordance with the signals from the sensing instruments may be conventional and, hence, are not shown. Likewise, structural elements such as concrete or other suitable shielding about the reactor vessel, scram rods and the like which are conventional in nuclear reactors but which form no part of the present invention are not shown.

Each of the fuel elements 20 in the reactor comprises a D.C. current generating thermoelectric cell, one embodiment of such a cell being shown in FIGURE 2. This cell comprises an outer tubular stainless steel or other suitable metal casing 30 having upper and lower ends shaped to nest in plates 22 and 24, respectively, of the reactor. An inner elongated annular shaped casing constructed of two concentric tubes 32 (which is a continuation of 10') and 34 sealed together at their lower ends by an annular metal plate 36, is secured concentrically within and spaced from the outer casing 30 to provide for the circulation of a coolant fluid around all the exterior walls of the inner casing. Hence the coolant fluid from conduit 10 (FIGURE 1) enters the innermost tube 10' as shown, flows downwardly, through tube 32, about the bottom of the inner casing, up along the outer wall 34 thereof and then out of the cell through tube 12'.

A tantalum or other high heat resistant metal sleeve 38 is positioned concentrically within and equally spaced from the inner and outer walls 32 and 34 of the inner casing, an annular ceramic member 40 serving to secure the lower end thereof and an annular flange 44 sealing the upper end to the top plate assembly of the casing 30. A series of openings 46 in the lower end of the sleeve allows circulation of gas from one side to the other of said sleeve within the inner casing 32. The fissile material for the element is provided as coatings 48 and 50 on the inner and outer surfaces of the sleeve 38. The space between the fissile material and the inner and outer walls of the casing 32 is filled with noble gas which enters from conduit 14 (FIGURE 1) through tube 14' at the top of the element, flows downwardly between tube 10' and sleeve 38, through openings 46, up between sleeve 38 and tube 34 and then out of the element through tube 16'. Electrical insulators 40, 52 and 54 electrically separate the sleeve 38 with its coatings of fissile material from the annular casing 32, the sleeve 38 being electrically connected to the gas inlet and outlet conduits, and the casing 32 being in electrical connection with the reactor vessel 8 through the coolant fluid inlet and outlet conduits.

In operation, the sustained nuclear fission reaction which occurs within the core zone of the reactor causes the generation of heat within the fissile material of cathode coatings 48 and 50. At the same time, the fission fragment bombardment from this nuclear reaction ionizes the noble gas and hence generates a plasma between the hot fissile material and the cooled casing 32, thereby generating an E.M.F. and a useful D.C. current which is taken off as shown schematically at 56 in FIGURES 1 and 2. In the particular embodiment shown in FIGURE 1, all of the elements are connected in parallel to produce a low-voltage high-amperage current; however, it will be obvious that the elements may, if desired, be connected in series to produce a high-voltage low-amperage current, or they may be connected in series parallel. Further, while in the embodiment above described, all of the fuel elements are thermoelectric cells as shown in FIGURE 2, if desired only a portion of the fuel elements need comprise such thermoelectric cells with the remainder of the fuel elements being of conventional structure to provide the required critical mass to sustain the nuclear reaction. For example, the invention may be used to take off only a small portion of the power from the reactor as thermoelectric cell generated current with the remainder being taken off as heat energy from the coolant, this by utilizing conventional cladded fissile material fuel rods as some of the fuel elements of the reactor, and the thermoelectric cell elements of this invention for the remainder. A single such thermoelectric cell in an otherwise conventionally fueled reactor may be used to indicate the power output of the reactor by way of the current generated.

As to the matter of materials, the outer casing 30 of the thermoelectric cell can be of any metal having suitable nuclear and physical properties, for example, stainless steel, zirconium or aluminum, depending upon the amount of heat resistance desired. The requirements for the material used for the inner casing 32 are about the same as for the outer casing 30 except that the inner casing material should have the highest possible electrical and heat conductivity commensurate with attainment of suitable nuclear and other physical properties. Hence the inner casing may, for example, be of stainless steel, zirconium, aluminum or copper, the latter having the advantage of excellent electrical and heat conductivity and therefore being preferred where temperature and nuclear requirements do not preclude its use.

The gas between the anode and cathode from which the plasma is generated by way of fission fragment ionization should be noncorrosive and have a low ionization potential as well as a low electron attachment coefficient. Preferably, though not necessarily, it should also have a low neutron cross section. In view of these desired properties the noble gases are much preferred for the plasma; any of the gases argon, krypton, xenon, neon, helium and nitrogen are satisfactory. The precise plasma pressure which will provide optimum efficiency will be dependent upon the particular gas used as well as the gap size between cathode and anode. Ideally, the combination of pressure and gap size should be such that the total fission fragment energy is fully expended within the gas for plasma generation, and is completely dissipated just prior to complete penetration of the fission fragments through the gas. Hence, the optimum pressure may range from on the order of 5 mm. Hg to as high as 2 atmospheres depending upon the particular gas and gap size used. With argon as the gas, uranium–235 as the fissile material, and with a 1 cm. gap, a 20 mm. Hg gas pressure is satisfactory.

The coolant fluid, which in all instances will have some moderating effect and which may, if desired, be selected for moderating as well as cooling properties, should preferably be a liquid, such as water or diphenyl, to attain maximum cooling per unit flow rate. However, a gas coolant such as helium or nitrogen may be used if such is desirable on the basis of other considerations.

As will be evident from the preceding discussion of the theory of the invention, the fissile material used as the cathode of the thermoelectric cell should preferably have the lowest possible work function as well as high temperature resistance and low volatility. Uranium carbide is an example of such material. Other fissile materials suitable for the cathode are uranium oxide, thorium oxide, thoriated tungsten and mixtures of uranium carbide with silicon carbide, tungsten, molybdenum, zirconium niobium, tantalum or their carbides. The uranium carbide-silicon carbide fuel material covered by United States patent application Serial No. 771,248, filed November 3, 1958, in the names of John B. Burnham, Jr., and James G. Darrah and assigned to the assignee of the present invention, is one example of such a mixture.

Whereas in the element shown in FIGURE 2 there is but a single thermoelectric cell, i.e., a single cathode concentrically incased by a single anode, the embodiment shown in FIGURES 3–6 incorporates a plurality of cells. Referring now to these figures, the element shown comprises an elongated generally box-shaped metal casing 58 containing three thermoelectric cells 60, 62 and 64 connected in parallel, together with coolant fluid passages for cooling the anode surfaces of the cells, and passages for supplying gas for generation of plasma within the cells. Each of the thermoelectric cells 60, 62 and 64 has a generally box-shaped structure of rectangular cross section, the inner wall surfaces 66 of the box forming the cell anode. A rectangular shaped plate 68 of fissile material forms the cathode of the cell and is supported and electrically separated from the anode by four ceramic rods 70 of square cross section. Suitable wiring 72 electrically connects the fissile material cathodes, the metal casing of the element serving as the electrical connection for the anodes. Coolant fluid, preferably a liquid, for the anode surfaces is supplied through the inner, generally annular shaped passage 74 at the top of the element from whence it flows through openings 76 and 78, down through passages 80 and 82 which are between the opposed outer surfaces of the anodes of adjacent cells, to the chamber 84 at the bottom of the element, up through passages 86 and 88 thereby cooling of the outer anode surfaces of the two outermost cells and then out of the cell through the generally annular shaped passage 90. To supply the gas for plasma generation within the cells, noble gas is passed through the outermost generally annular passage 92, downwardly through the passages 94 and 96 (see FIGURE 4) which are at opposite sides of the casing, then up into and through each of the cells between the respective cathodes and anode walls, and then out of the cell through the innermost passage 98 at the upper end thereof.

Operation of each of the three cells of this embodiment is, of course, the same as previously described with reference to the FIGURE 2 embodiment. The fissile material of the cathode plate 68 is maintained at a high temperature by way of the fission reaction, fission fragments causing ionization of the noble gas to create a plasma. The E.M.F. thereby generated is taken off as diagrammatically shown in FIGURE 3 at 100.

By using high temperature-resistant fissile material such as uranium carbide or uranium oxide, or mixtures of these with other high heat-resistant, relatively low work function materials of suitable neutron cross section, cathode temperatures on the order of 1500 to 3500° K. and above are feasible. Thus, with a high coolant flow rate to maintain the anode temperature at a minimum, a temperature differential of from 1000° upwards to as high as about 3000° K. can be maintained to provide a high output of useful D.C. current. By circulating the noble gas for plasma generation into and out of the cells, fresh gas can be constantly fed into the system and used gas removed at a rate sufficient to prevent a significant build-up of fission gases, such as xenon-135, which will be the product of the nuclear reaction and which would otherwise tend to limit fuel burn-up. Hence, removing the fission gases in accordance with this feature of the invention allows a more complete burn-up of fissile material before reprocessing is required.

While the invention has been described specifically with reference to particular embodiments thereof, it will be understood that numerous other embodiments are possible and that various changes and modifications may be made, all within the full and intended scope of the claims which follow.

We claim:

1. A device for converting nuclear energy to electrical energy comprising a thermoelectric cell having a cathode containing a fissile material, the total fissile material within said device constituting a critical mass to sustain a chain nuclear fission reaction, a conductive anode in spaced relationship with and electrically insulated from said cathode, a gas between said anode and said cathode ionizable by fission fragments from said cathode, means for cooling said anode, and means for taking off the E.M.F. generated between said anode and said cathode.

2. A device for converting nuclear energy to electrical energy comprising a thermoelectric cell having a cathode containing a fissile material, the total fissile material within said device constituting a critical mass to sustain a chain nuclear fission reaction, a conductive anode in spaced relationship with and electrically insulated from said cathode, means for circulating between said anode and said cathode a gas ionizable by fission fragments from said cathode, means for circulating a cooling fluid through said device for cooling said anode, and means for taking off the E.M.F. generated between said anode and said cathode.

3. A device for converting nuclear energy to electrical energy comprising a thermoelectric cell having a cathode containing a fissile material, the total fissile material within said device constituting a critical mass to sustain a chain nuclear fission reaction, a conductive anode in spaced relationship with and electrically insulated from said cathode, a noble gas between said anode and said cathode ionizable by fission fragments from said cathode, means for cooling said anode, and means for taking off the E.M.F. generated between said anode and said cathode.

4. In a nuclear reactor device containing a critical mass of fissile material to sustain a chain nuclear reaction, a thermoelectric cell comprising a cathode containing a fissile material, the fissile material of said cathode forming a part of the critical mass within the reactor device, an electrically conductive anode in spaced relationship with and electrically insulated from said cathode, a gas between said anode and said cathode ionizable by fission fragments from said cathode, means for cooling said anode, and means for taking off the E.M.F. generated between said anode and said cathode.

5. In a nuclear reactor device containing a critical mass of fissile material to sustain a chain nuclear reaction, a thermoelectric cell comprising a high heat resistant cathode containing a fissile material, the fissile material of said cathode forming a part of the critical mass within the reactor device, a metal anode of high heat and electrical conductivity in spaced relationship with and electrically insulated from said cathode, a noble gas between said anode and said cathode ionizable by fission fragments from said cathode, means for cooling said anode, and means for taking off the E.M.F. generated between said anode and said cathode.

6. In a nuclear reactor device containing a critical mass of fissile material to sustain a chain nuclear reaction, a thermoelectric cell comprising a cathode containing a fissile material consisting predominantly of uranium carbide, the fissile material of said cathode forming a part of the critical mass within the reactor, a metal anode in spaced relationship with said cathode, a gas between said anode and said cathode ionizable by fission fragments from said cathode, said gas being selected from the group consisting of argon, krypton, xenon, neon, helium and nitrogen, means for cooling said anode, and means for taking off the E.M.F. generated between said anode and said cathode.

7. In a nuclear reactor device containing a critical mass of fissile material to sustain a chain nuclear reaction, a thermoelectric cell comprising a cathode containing a fissile material selected from the group consisting of uranium carbide, uranium oxide, thorium oxide and thoriated tungsten, the fissile material of said cathode forming a part of the critical mass within the reactor, an electrically conductive anode in spaced relationship with said cathode, a noble gas between said anode and said cathode ionizable by fission fragments from said cathode, means for cooling said anode, and means for taking off the E.M.F. generated between said anode and said cathode.

8. In a nuclear reactor device containing a critical mass of fissile material to sustain a chain nuclear reaction, a thermoelectric cell comprising a cathode of a high heat resistant fissile material, the fissile material of said cathode forming a part of the critical mass within the reactor, a metal anode surrounding said cathode in spaced relationship therewith, means for circulating between said anode and said cathode a noble gas ionizable by fission fragments from said cathode, means for cooling said anode, and means for taking off the E.M.F. generated between said anode and said cathode.

9. A device for converting nuclear energy to electrical energy comprising a thermoelectric cell having a cathode containing a fissile material, the total fissile material within said device constituting a critical mass to sustain a chain nuclear fission reaction, a conductive anode in spaced relationship with and electrically insulated from said cathode, a gas between said anode and said cathode ionizable by fission fragments from said cathode and means for cooling said anode, the space between said cathode and anode and the pressure of said noble gas being such that substantially the total energy of the fission fragments from said cathode is dissipated in ionizing said gas.

10. A device for converting nuclear energy to electrical energy comprising a thermoelectric cell having a cathode of a fissile material consisting predominantly of uranium carbide, the total fissile material within said device constituting a critical mass to sustain a chain nuclear fission reaction, a metal anode spaced about one centimeter from said cathode, means for circulating argon between said anode and said cathode at about 20 mm. Hg pressure, means for cooling said anode, and means for taking off the E.M.F. generated between said anode and said cathode.

11. A thermionic converter comprising an anode, means for cooling the anode, a heated cathode spaced therefrom, a noble gas between the anode and cathode, and fissionable material on the surface of said cathode to furnish fission fragments for ionizing said noble gas.

12. A thermionic converter comprising an anode, means for cooling the anode, a cathode spaced therefrom, a noble gas between the anode and cathode, and means for heating said cathode and for ionizing said gas comprising fissionable material on the surface of said cathode.

13. A thermoelectric converter comprising an anode, means for cooling the anode, a cathode spaced therefrom, an easily ionized gas between the anode and cathode, means for ionizing said gas to form a plasma comprising a source of fission fragments disposed adjacent said gas and means for establishing a field of neutron flux through said source to cause fissioning of said source.

14. A thermionic converter comprising an anode, means for cooling the anode, a heated cathode spaced therefrom, a noble gas between the anode and cathode, fissionable material on the surface of said cathode to furnish fission fragments for ionizing said noble gas, and means for establishing a field of neutron flux through said material to cause fissioning of said material.

15. A thermionic converter comprising an anode, means for cooling the anode, a cathode spaced therefrom, a noble gas between the anode and cathode, means for heating said cathode and for ionizing said gas comprising fissionable material on the surface of said cathode, and means for establishing a field of neutron flux through said material to cause fissioning of said material.

References Cited in the file of this patent

UNITED STATES PATENTS

| 2,498,925 | Linder | June 3, 1952 |
| 2,728,867 | Wilson | Dec. 27, 1955 |
| 2,735,019 | De Wan et al. | Feb. 14, 1956 |
| 2,811,568 | Lloyd | Oct. 29, 1957 |
| 2,902,423 | Luebke et al. | Sept. 1, 1959 |

FOREIGN PATENTS

| 309,241 | Great Britain | Apr. 11, 1929 |

OTHER REFERENCES

J. of Applied Physics, April 1959, Volney C. Wilson. Paper received September 15, 1958, pp. 475–481.

Bull., Am. Phys. Soc. 3, p. 266 (1958).

R.C.A. Review 19, pp. 244, 258 (1958).

J. of Applied Physics, vol. 29, No. 11, November 1958, pp. 1611, 1612.

J. of Applied Physics, December 1959, pp. 2017–2018, 310–3A.

Notice of Adverse Decision in Interference

In Interference No. 94,682 involving Patent No. 3,093,567, F. E. Jablonski (now by change of name F. E. Jamerson) and C. B. Leffert, NUCLEAR DEVICE FOR GENERATING ELECTRIC POWER, final judgment adverse to the patentees was rendered May 2, 1966, as to claims 1, 4 and 13.

[*Official Gazette June 28, 1966.*]